United States Patent [19]
Hoover

[11] Patent Number: 5,378,854
[45] Date of Patent: Jan. 3, 1995

[54] ELECTRICAL OUTLET BOX ASSEMBLY

[76] Inventor: Daniel M. Hoover, 416 Salem Ave., Hagerstown, Md. 21740

[21] Appl. No.: 44,806

[22] Filed: Apr. 12, 1993

[51] Int. Cl.6 .............................................. H02G 3/08
[52] U.S. Cl. ...................................... 174/53; 220/3.92
[58] Field of Search ...................... 174/53, 58; 220/3.9, 220/3.92, 3.94

[56] References Cited

U.S. PATENT DOCUMENTS

| | | | |
|---|---|---|---|
| 1,066,215 | 7/1913 | Murray | 220/3.94 |
| 1,133,946 | 3/1915 | Farrell | 220/3.92 |
| 1,326,498 | 12/1919 | Hayden | 220/3.94 |
| 1,857,787 | 5/1932 | Meeks et al. | 220/3.94 |
| 1,963,951 | 6/1934 | Bowers | 220/3.92 |
| 2,028,509 | 1/1936 | Knell | 220/3.94 |
| 2,552,400 | 5/1951 | Brunia | 220/3.94 |
| 2,644,600 | 7/1953 | Senif | 220/3.9 |
| 3,040,926 | 6/1962 | Palmer | 220/3.9 |
| 3,701,451 | 10/1972 | Schindler et al. | 174/53 |
| 4,428,492 | 1/1984 | Jorgensen | 220/3.94 |

*Primary Examiner*—Leo P. Picard
*Assistant Examiner*—David Tone
*Attorney, Agent, or Firm*—E. Michael Combs

[57] ABSTRACT

An electrical box assembly arranged for the ease of stacking of boxes relative to one another in a gang-type relationship is provided, wherein the box structure includes a box member having a fixed side wall integrally mounted to a rear wall, a top wall, and a bottom wall having a movable side wall arranged for sliding reception within the top wall and bottom wall and lock engagement to the rear wall, wherein the movable side wall may be replaced by a further box member providing ease of ganging of the boxes together.

1 Claim, 4 Drawing Sheets

ELECTRICAL OUTLET BOX ASSEMBLY

BACKGROUND OF THE INVENTION

1. Field of the Invention

The field of invention relates to electrical box structure, and more particularly pertains to a new and improved electrical outlet box assembly wherein the same is arranged to permit the ganging of boxes relative to one another.

2. Description of the Prior Art

Electrical outlet boxes of various types have been utilized in the prior art and exemplified in by the U.S. Pat. Nos. 4,612,412; 4,821,904; 4,903,851; 4,845,312; and 4,854,885.

The instant invention attempts to overcome deficiencies of the prior art by providing for electrical outlet box structure arranged for the assembly in optional relationship of a plurality of box members together. To this end, the instant invention permits the selective mounting of an additional box in lieu of a movable side wall relative to the box structure of the invention and in this respect, the present invention substantially fulfills this need.

SUMMARY OF THE INVENTION

In view of the foregoing disadvantages inherent in the known types of outlet box apparatus now present in the prior art, the present invention provides an electrical outlet box assembly wherein the same is arranged for the mounting of an accessory box relative to a base box. As such, the general purpose of the present invention, which will be described subsequently in greater detail, is to provide a new and improved electrical outlet box assembly which has all the advantages of the prior art outlet box apparatus and none of the disadvantages.

To attain this, the present invention provides an electrical box assembly arranged for the ease of stacking of boxes relative to one another in a gang-type relationship, wherein the box structure includes a box member having a fixed side wall integrally mounted to a rear wall, a top wall, and a bottom wall having a movable side wall arranged for sliding reception within the top wall and bottom wall and lock engagement to the rear wall, wherein the movable side wall may be replaced by a further box member providing ease of ganging of the boxes together.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved electrical outlet box assembly which has all the advantages of the prior art electrical outlet box apparatus and none of the disadvantages.

It is another object of the present invention to provide a new and improved electrical outlet box assembly which may be easily and efficiently manufactured and marketed.

It is a further object of the present invention to provide a new and improved electrical outlet box assembly which is of a durable and reliable construction.

An even further object of the present invention is to provide a new and improved electrical outlet box assembly which is susceptible of a low cost of manufacture with regard to both materials and labor, and which accordingly is then susceptible of low prices of sale to the consuming public, thereby making such electrical outlet box assemblies economically available to the buying public.

Still yet another object of the present invention is to provide a new and improved electrical outlet box assembly which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
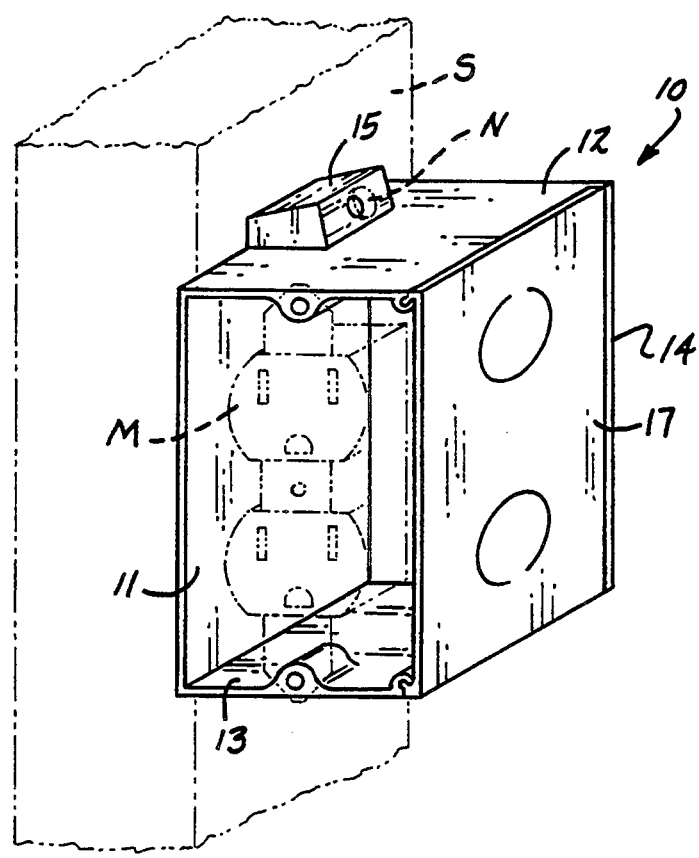
FIG. 1 is an isometric illustration of the invention.
Figure 2:
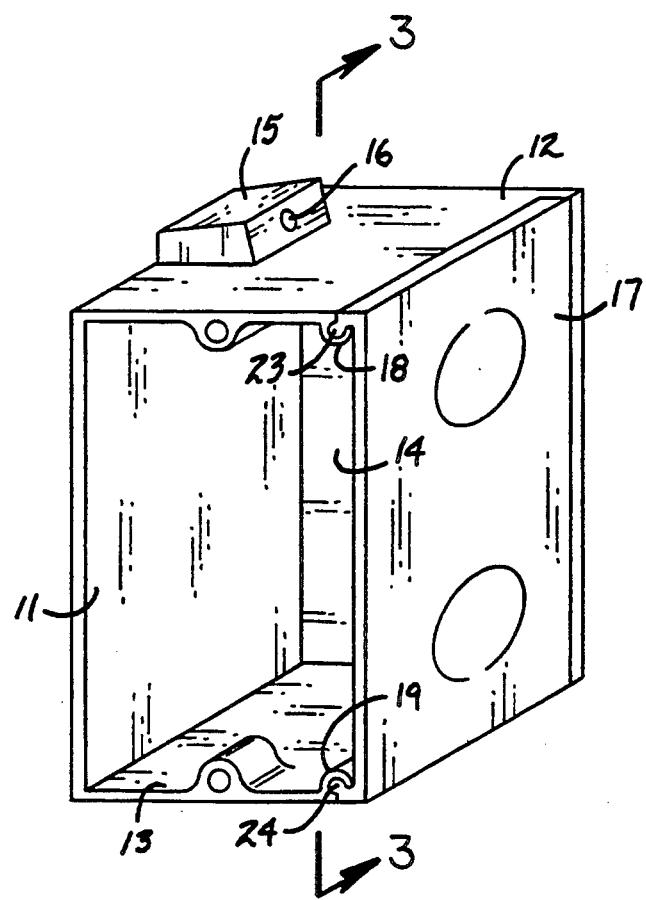
FIG. 2 is an isometric illustration of the invention spaced from the wall stud as indicated in FIG. 1.
Figure 3:
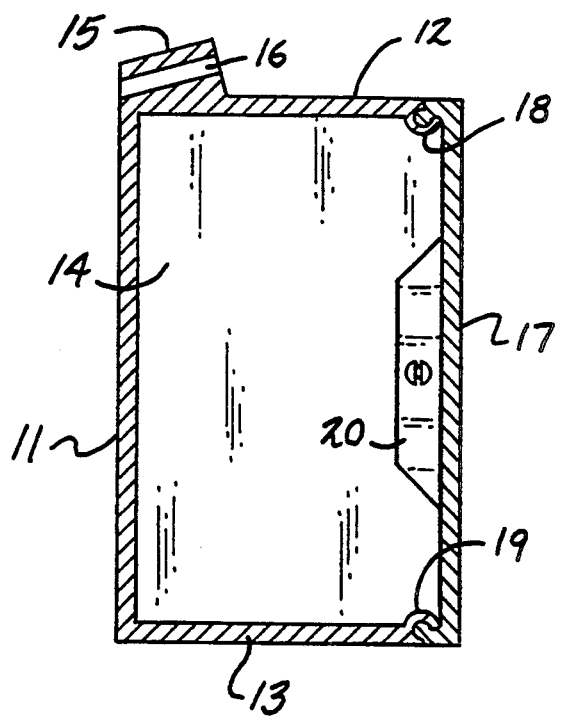
FIG. 3 is an orthographic view, taken along the lines 3—3 of FIG. 2 in the direction indicated by the arrows.
Figure 4:
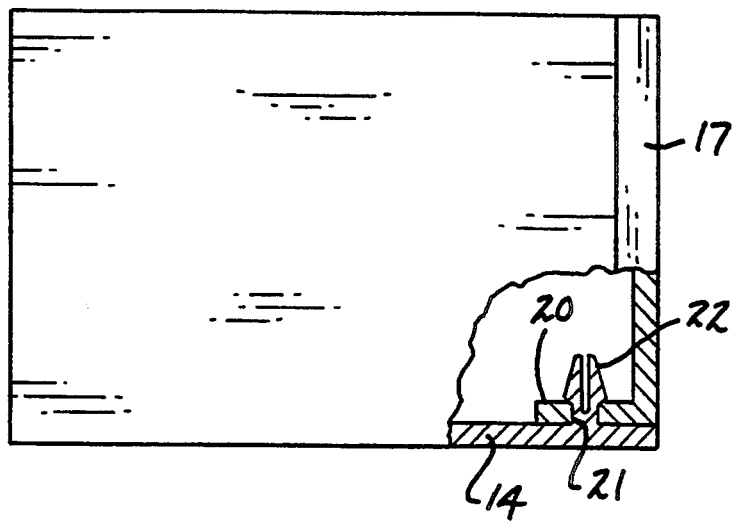
FIG. 4 is an orthographic bottom view, partially in section, of the box structure.

With reference now to the drawings, and in particular to FIGS. 1 to 8 thereof, a new and improved electrical outlet box assembly embodying the principles and concepts of the present invention arid generally designated by the reference numeral 10 will be described.

More specifically, the electrical outlet box assembly 10 of the instant invention essentially comprises a fixed side wall 11 integrally and orthogonally mounted to a top wall 12 and integrally mounted to a bottom wall 13, wherein the top and bottom walls are arranged in a spaced parallel, coextensive relationship, and a rear wall 14 fixedly mounted to the fixed side wall 11, as well as the top and bottom walls 12 and 13 respectively. A top wall lug 15 integrally mounted to the top wall in adjacency to the fixed side wall 11 includes a lug bore 16 oriented at an acute angle relative to the fixed side wall to receive a nail member "N" therethrough (see FIG. 1) for securement to a support stud "S". The respective top and bottom walls 12 and 13 include respective first and second semi-cylindrical troughs 18 and 19 arranged in a parallel, coextensive relationship relative to the free end portions of the top and bottom walls, wherein a movable side wall 17 is provided, having respective first and second ribs 23 and 24 at upper and lowermost ends of the movable side wall 17, wherein the first and second ribs are arranged in a parallel spaced coextensive relationship and received within respective first and second troughs 18 and 19 to receive the movable wall relative to the top and bottom walls. A movable side wall flange 20 fixedly and orthogonally mounted to the movable side wall includes a flange aperture 21 that is arranged for contiguous communication with the rear wall 14, with the rear wall 14 having a rear wall locking lug 22 arranged for reception through the flange aperture 21 to latch the movable wall relative to the rear wall 14, as well as the box assembly. Top and bottom wall bosses 25 and 26 arranged in a facing mirror image relationship relative to one another are arranged for mounting of an electrical outlet member "M", as indicated in FIG. 1.

Figure 5:
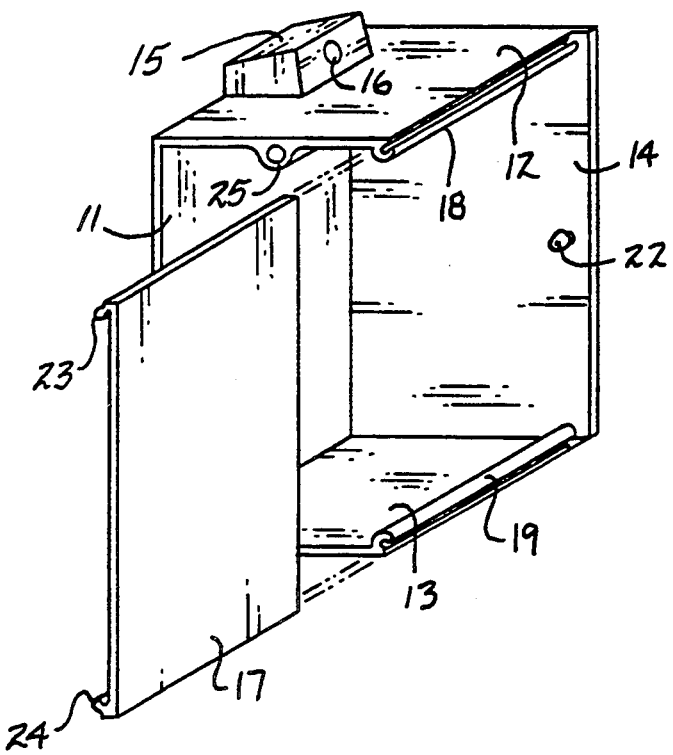
FIG. 5 is an isometric illustration of the invention having the removable side wall displaced relative to the box structure.
Figure 6:
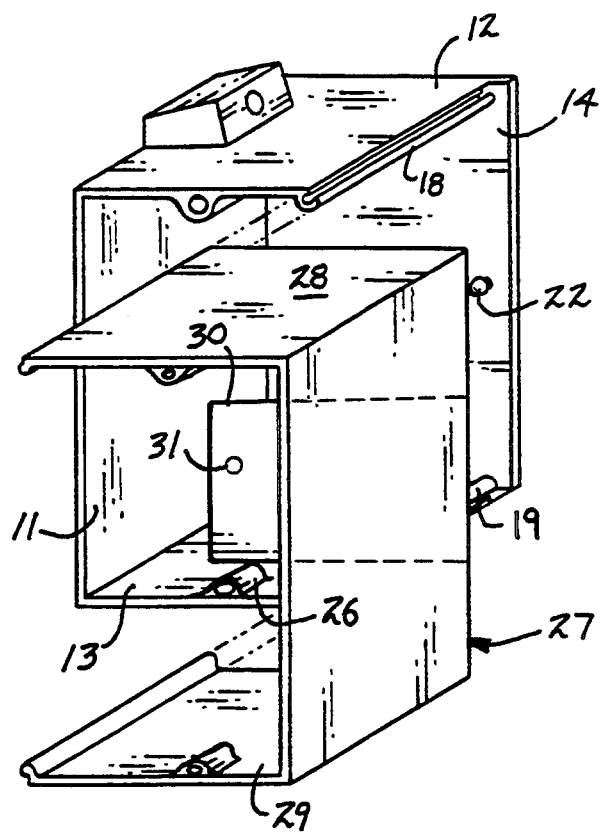
FIG. 6 is an isometric illustration of the invention employing an additional box member.

The FIG. 6 indicates the use of an accessory box structure 27 with accessory box top and bottom walls 28 and 29, including individual accessory box ribs arranged for reception within the first and second troughs 18 and 19 for securement of the accessory box relative to the top and bottom walls 12 and 13, with an accessory box flange 30 having a flange bore 31 for mounting and reception of the locking lug 22 for securing an accessory box in lieu of the movable wall 17, as indicated in FIG. 5.

Figure 7:
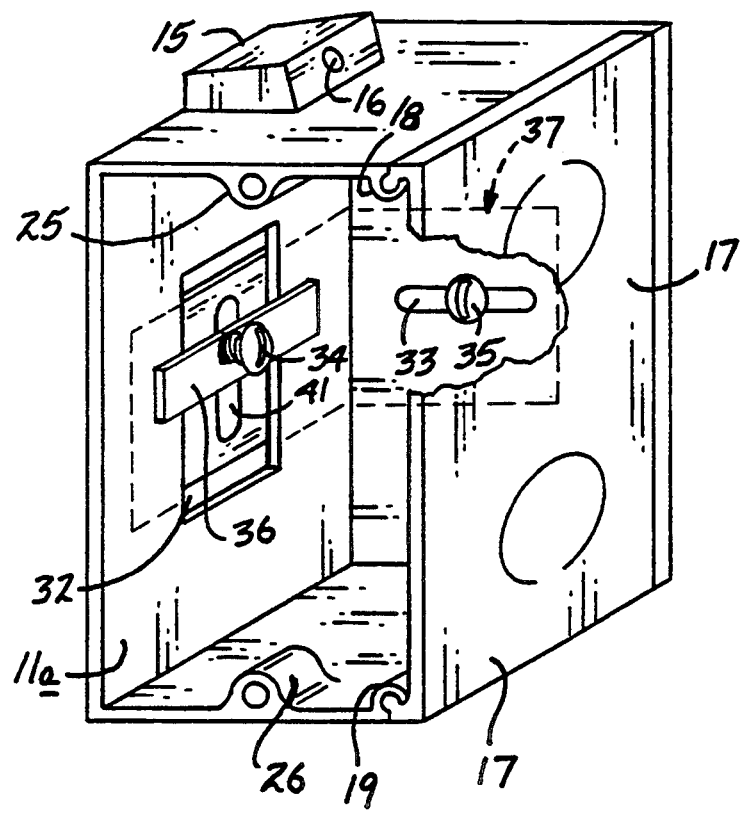
FIG. 7 is an isometric illustration of the invention employing a positioning bracket relative to the box structure.
Figure 8:
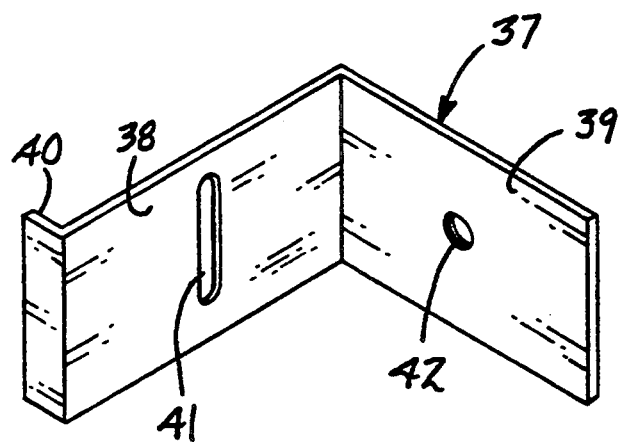
FIG. 8 is an isometric illustration of the positioning bracket.

The FIGS. 7 and 8 indicate the use of a positioning bracket 37, of a type as indicated in FIG. 8, in association with a box structure, wherein a modified fixed side wall 11a includes a side wall opening 32 in cooperation with a rear wall slot 33 as a first fastener 34, having a fastener plate 36 positioned interiorly of the box structure is received through a first plate slot 41 in permitting the first fastener for securement to the associated stud "S", wherein the rear wall slot 33 provides access of the second fastener 35 through the second plate opening 42 such that a first plate 38 of the positioning bracket 37 is orthogonally mounted to a second plate 39 in an integral relationship, with the positioning flange 40 integrally and orthogonally mounted to the first plate 38 in a parallel relationship extending to an opposed side of the first plate 38 such that the positioning flange 40 is arranged to engage and position the box structure relative to the stud "S". In lieu of the use of the fastener plate 36, the first fastener 34 may be arranged to fasten initially the positioning bracket 37 to the stud "S" and subsequently positioning the box onto the positioning bracket and onto the first and second plates 38 and 39 permitting the second fastener 35 to be received through the rear wall slot 33 and into the second plate internally threaded opening 42. In this manner, the second fastener mounts the box temporarily to the positioning bracket wherein subsequently, the top wall lug 15 is arranged to receive a nail "N" through the lug bore 16, in a manner as indicated in FIG. 1.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An electrical outlet box assembly, comprising,
    a box member having a fixed side wall, a top wall spaced from a bottom wall in a parallel coextensive relationship integrally and orthogonally mounted to the fixed side wall, with the box member further including a rear wall, and
    the top wall having a top wall lug, the top wall lug positioned in adjacency to the fixed side wall, and having a lug bore directed through the top wall lug oriented at an acute angle relative to the top wall, and
    the top wall including a top wall free edge, the bottom wall including a bottom wall free edge, wherein the top wall free edge and the bottom wall free edge are arranged in a parallel coextensive relationship relative to one another, and a top wall free edge having a first semi-cylindrical trough, the bottom wall free edge having a second semi-cylindrical trough, and
    a movable side wall, the movable side wall having a first rib spaced from a second rib, with the first and second rib arranged for reception within a respective first trough and second trough respectively, and the rear wall includes a rear wall locking lug fixedly mounted to the rear wall in an orthogonal projecting relationship directed between the top wall and the bottom wall, and the movable side wall includes a side wall flange orthogonally and integrally mounted to the side wall, and the side wall flange includes a side wall flange aperture arranged for receiving the rear wall locking lug upon projection of the movable side wall into continuous communication with the rear wall, and a U-shaped accessory box arranged for mounting to the top wall and the bottom wall, and the accessory box includes an accessory box top wall having an accessory box rib arranged for reception within the first trough, and including an accessory box bottom wall having a bottom wall rib arranged for reception within the second trough upon displacement of the movable side wall relative to the top wall and the bottom wall, and the fixed side wall includes a side wall opening, and the rear wall includes a rear wall slot, and a positioning bracket arranged for mounting to the fixed side wall and the rear wall, wherein the positioning bracket includes a first plate having a first plate slot arranged for receiving the fastener therethrough for positioning into a wall stud, and a second plate integrally and orthogonally mounted to the first plate in an L-shaped configuration, wherein the second plate includes a second plate opening, and wherein a second fastener is arranged for reception through the rear wall slot and threadedly received within the second wall opening, and the first plate having a first plate positioning flange integrally and orthogonally mounted to the first plate spaced from the second plate, and positioning flange projecting beyond a first side of the first plate, and the second plate extends beyond a second side of the second plate, wherein the positioning plate is arranged for abutting the wall stud for positioning the fixed side wall thereto.

* * * * *